(12) United States Patent
Valdez et al.

(10) Patent No.: US 7,654,231 B1
(45) Date of Patent: Feb. 2, 2010

(54) SYSTEM AND METHOD FOR POWERING A VEHICLE

(75) Inventors: Ruben Valdez, San Antonio, TX (US); Cindi Kathleen Scheele, Comfort, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/461,618

(22) Filed: Aug. 1, 2006

(51) Int. Cl.
*F02G 3/02* (2006.01)

(52) U.S. Cl. .................. 123/1 A; 123/557; 123/576; 123/585

(58) Field of Classification Search ............ 123/1 A, 123/23, 557, 575, 585
See application file for complete search history.

(56) References Cited

U.S. PATENT DOCUMENTS

| | | | |
|---|---|---|---|
| 404,425 A | | 6/1889 | Obenchain |
| 2,083,572 A | * | 6/1937 | McKee .................. 549/431 |
| 2,794,431 A | * | 6/1957 | Ginnow .................. 123/510 |
| 2,986,279 A | | 5/1961 | Henigman |
| 3,065,854 A | * | 11/1962 | Winslow .................. 210/130 |
| 3,171,807 A | | 3/1965 | Neuman |
| 3,900,397 A | | 8/1975 | Bell |
| 4,029,067 A | * | 6/1977 | Giammattei .................. 123/530 |
| 4,522,158 A | * | 6/1985 | Wisegerber .................. 123/1 A |
| 4,772,401 A | * | 9/1988 | Rawlins .................. 210/788 |
| 4,840,732 A | * | 6/1989 | Rawlins .................. 210/306 |
| 4,862,837 A | * | 9/1989 | Holmes .................. 123/23 |
| 5,055,204 A | * | 10/1991 | Bogart .................. 210/758 |
| 5,059,743 A | * | 10/1991 | Sakuma .................. 585/899 |
| 5,174,892 A | | 12/1992 | Davis |
| 5,313,915 A | * | 5/1994 | McDowell et al. .......... 123/23 |
| 5,336,418 A | * | 8/1994 | Rawlins .................. 210/799 |
| 6,016,839 A | * | 1/2000 | Raftis et al. .................. 137/846 |
| 6,364,917 B1 | | 4/2002 | Matsumura et al. |
| 6,382,170 B1 | | 5/2002 | Mang et al. |
| 6,604,304 B1 | * | 8/2003 | Slabach et al. .................. 37/304 |
| 7,261,063 B1 | * | 8/2007 | Holland .................. 123/1 A |
| 2002/0158141 A1 | | 10/2002 | Ryu |
| 2005/0054522 A1 | | 3/2005 | Haskew |
| 2006/0037919 A1 | * | 2/2006 | Lara et al. .................. 210/805 |
| 2007/0062496 A1 | | 3/2007 | Snower et al. |

OTHER PUBLICATIONS

Dancing Rabbit Ecovillage, Grassroots Biodiesel and Vegetable Oil Fuel Homepage, Running a diesel vehicle on straight vegetable oil (SVO); Jun. 2, 2006, 1 page.
Jim Washburn, The Basics, Fill Your Tank with Vegetable Oil, Jun. 2, 2006, MSN Money, 6 pages.
Wikipedia, Straight Vegetable Oil, Jun. 2, 2006, 3 pages.
John Bush, Straight Vegetable Oil Fuel Systems, Jun. 2, 2006, Boulder Biodiesel, 3 pages.

* cited by examiner

*Primary Examiner*—Thomas N Moulis
(74) *Attorney, Agent, or Firm*—Brooks, Cameron & Huebsch, PLLC (57) ABSTRACT

Disclosed are systems and methods for powering a vehicle. The systems and methods provide techniques for agitating fuel stored in a fuel storage tank and then combusting that fuel to power a vehicle.

12 Claims, 11 Drawing Sheets

# SYSTEM AND METHOD FOR POWERING A VEHICLE

CROSS REFERENCE TO RELATED APPLICATIONS

The present application is related to (1) U.S. Utility application Ser. No. 11/461,578, filed on Aug. 1, 2006, and (2) U.S. Utility application Ser. No. 11/461,510, filed on Aug. 1, 2006.

FIELD OF THE DISCLOSURE

Various embodiments of the disclosure pertain to a system and method for storing fuel and, more particularly, to a system and method which include a fuel storage tank and a fuel agitation system coupled to the fuel storage tank and operable to agitate a fuel that is stored in the fuel storage tank for use in a power generation system.

BACKGROUND

Storing fuel is well-known and readily appreciated by those of skill in the art. Typically, fuel is stored in a fuel storage tank for use by an engine coupled to the fuel storage tank in order to generate power. However, growing concerns about the environment along with concerns about fuel costs has begun a shift from petroleum based fuels to non-petroleum based organic fuels. The storing of these non-petroleum based organic fuels raises a number of issues.

Some non-petroleum based organic fuels such as, for example, vegetable oil, can stagnate when stored in a fuel storage tank. This stagnation can include the vegetable oil at least partially solidifying in the fuel storage tank, can prevent the vegetable oil from being used as a fuel by the engine, and can dirty the engine such that the engine requires frequent cleaning in order to be able to operate.

Accordingly, it would be desirable to provide for storing fuel absent the disadvantages discussed above.

SUMMARY

Various embodiments of the present disclosure are directed to systems and methods for storing fuel. The systems and methods provide techniques for agitating fuel stored in a fuel storage tank and then combusting that fuel in order to power a vehicle.

BRIEF DESCRIPTION OF THE DRAWINGS

FIG. 2b is a perspective view illustrating an embodiment of a holding tank and fuel agitation system used in the engine fuel storage system of FIG. 2a.

FIG. 2c is a perspective view illustrating an embodiment of a holding tank and fuel agitation system used in the engine fuel storage system of FIG. 2a.

FIG. 2d is a perspective view illustrating an embodiment of a holding tank and fuel agitation system used in the engine fuel storage system of FIG. 2a.

FIG. 4b is a perspective view illustrating an embodiment of a holding tank and fuel agitation system used in the engine fuel storage system of FIG. 4a.

FIG. 4c is a perspective view illustrating an embodiment of a holding tank and fuel agitation system used in the engine fuel storage system of FIG. 4a.

FIG. 4d is a perspective view illustrating an embodiment of a holding tank and fuel agitation system used in the engine fuel storage system of FIG. 4a.

DETAILED DESCRIPTION

Figure 1:
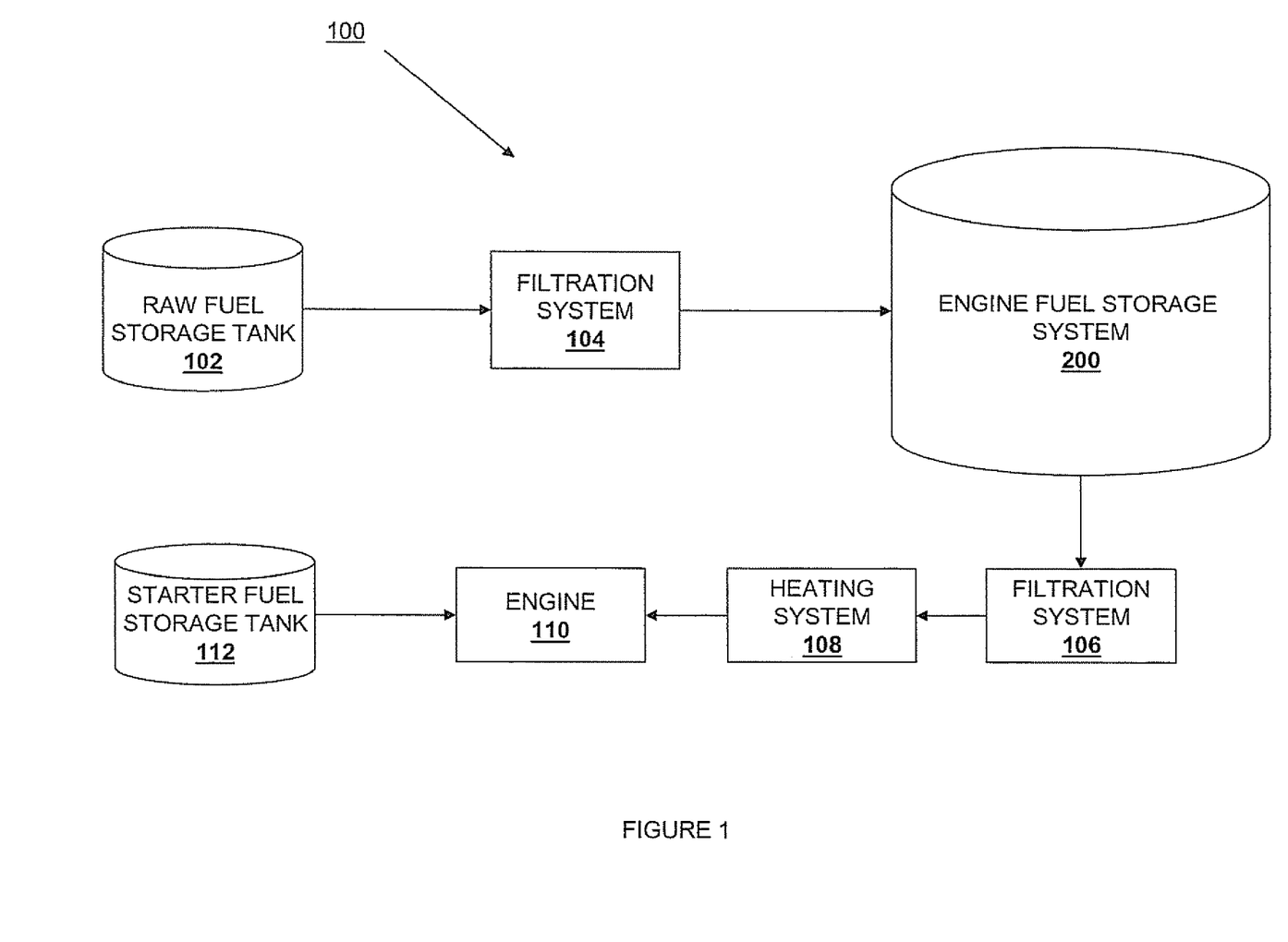
FIG. 1 is a schematic view illustrating an embodiment of a power generation system.
Figure 2A:
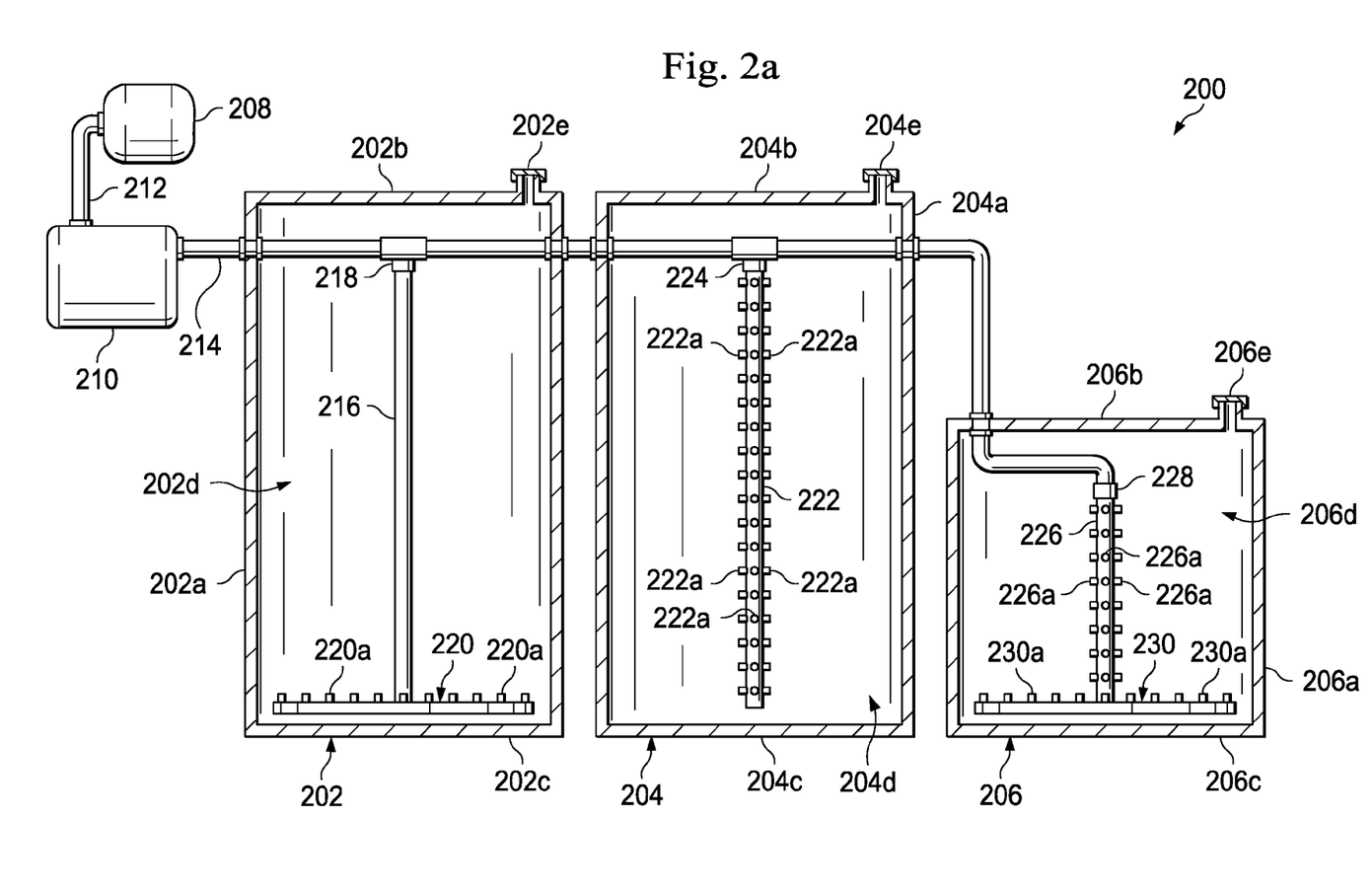
FIG. 2a is a side view illustrating an embodiment of engine fuel storage system used in the power generation system of FIG. 1.
Figure 2B:
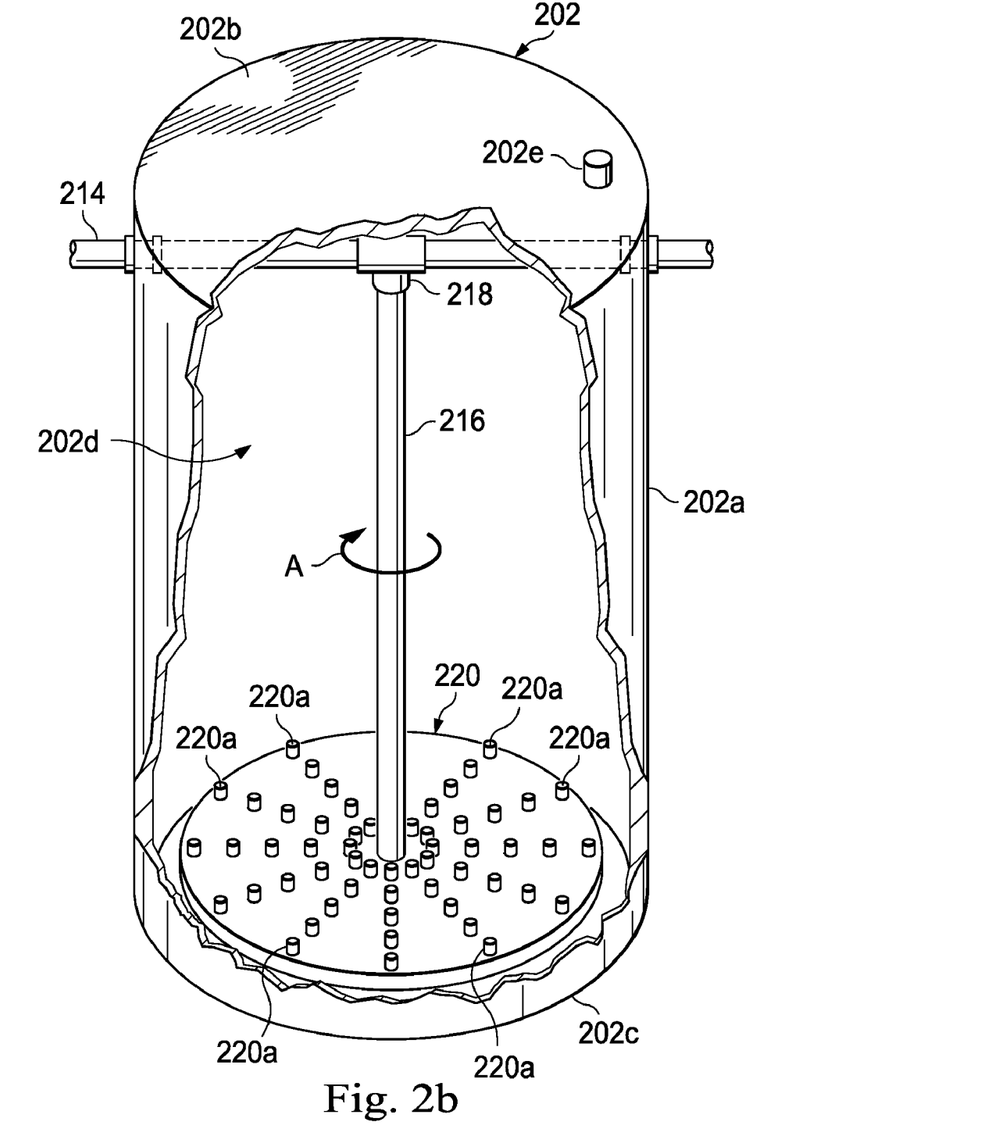
Figure 2C:
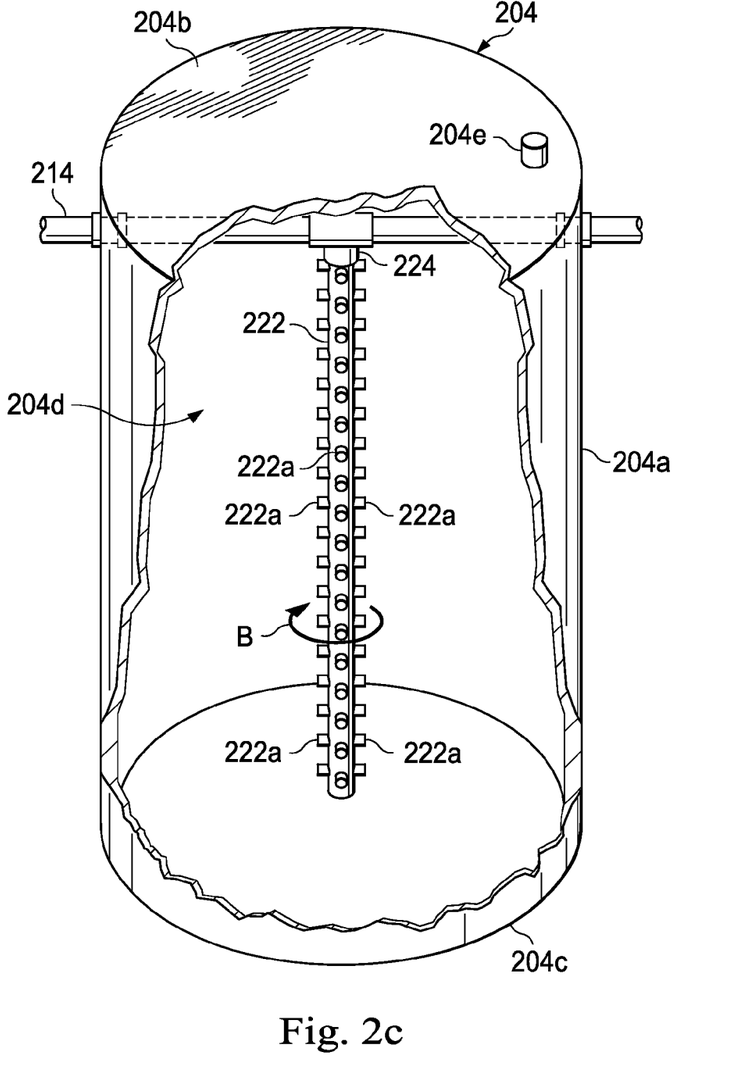
Figure 2D:
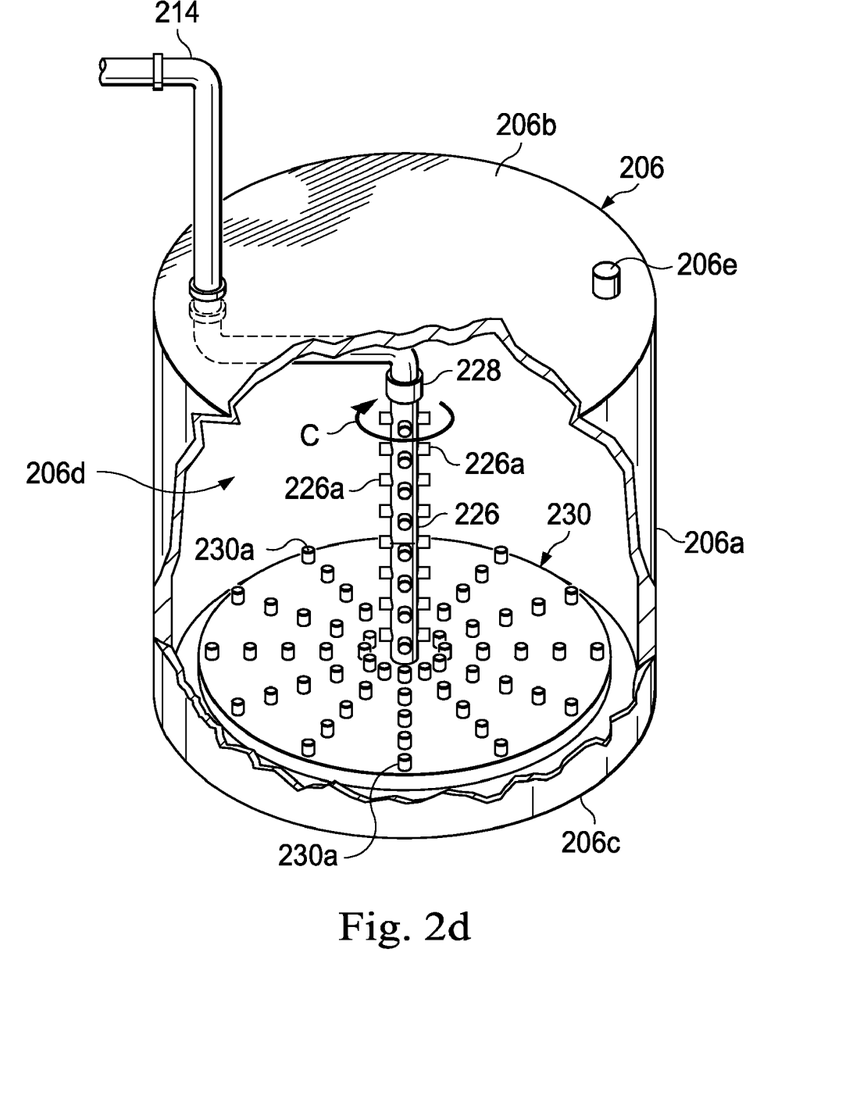

Referring now to FIG. 1, a power generation system 100 is illustrated. The power generation system 100 includes a raw fuel storage tank 102. The raw fuel storage tank 102 is a convention fuel storage tank known in the art that is operable to store non-petroleum based organic fuels such as, for example, vegetable oil, peanut oil, corn oil, canola oil, and a variety of other non-petroleum based organic fuels known in the art. The raw fuel storage tank 102 is coupled to a filtration system 104 using methods known in the art such that raw fuel stored in the raw fuel storage tank 102 can be transferred from the raw fuel storage tank 102 to the filtration system 104. The filtration system 104 is a convention filtration system known in the art that is operable to filter impurities in raw fuel such as, for example, waste vegetable oils or other waste cooking oils, in order to convert the raw fuel into engine fuel. The filtration system 104 is coupled to an engine fuel storage system 200 using methods known in the art such that the raw fuel that has been converted to engine fuel can be transferred from the filtration system 104 to the engine fuel storage system 200. The engine fuel storage system 200 is a fuel storage tank that is operable to store non-petroleum based organic fuels such as, for example, vegetable oil, peanut oil, corn oil, canola oil, and a variety of other non-petroleum based organic fuels known in the art that have had impurities removed by the filtration system 104. In an embodiment, the engine fuel storage system 200 may not include the raw fuel storage tank 102 and the filtration system 104, and engine fuel that was either manufactured without impurities or filtered separate from the power generation system 100 may be stored in the engine fuel storage system 200. The engine fuel storage system 200 is coupled to a filtration system 106 using methods known in the art such that engine fuel stored in the engine fuel storage system 200 can be transferred from the engine fuel storage system 200 to the filtration system 106. The filtration system 106 is a conventional filtration system known in the art that is operable to filter impurities in the engine fuel that may have not been filtered by the filtration system 104, that may have been introduced to the engine fuel in the engine fuel storage system 200, or that may be present in the engine fuel for whatever reason.

The filtration system 106 is coupled to a heating system 108 using methods known in the art such that the engine oil that passes through the filtration system 106 from the engine fuel storage system 200 can be transferred from the filtration system 106 to the heating system 108. The heating system 108 is a convention heating system known in the art that is operable to heat the engine oil in order to lower its viscosity and prepare it for combustion. The heating system 108 is coupled to an engine 110 using methods known in the art such that the engine fuel that has been heated in the heating system`

108 can be transferred from the heating system 108 to the engine 110. The engine 110 is a conventional engine that is operable to combust non-petroleum based organic fuels such as, for example, vegetable oil, peanut oil, corn oil, canola oil and a variety of other non-petroleum based organic fuels known in the art. In an embodiment, the engine 110 is a conventional diesel combustion engine. The engine 110 is coupled to a starter fuel storage tank 112 using methods known in the art such that the starter fuel stored in the start fuel storage tank 112 can be transferred from the starter fuel storage tank 112 to the engine 110. In an embodiment, the start fuel storage tank 112 is a conventional fuel storage tank known in the art that is operable to store petroleum based fuels such as, for example, diesel fuel.

Referring now to FIGS. 2a, 2b, 2c and 2d, the engine fuel storage system 200 is illustrated in more detail. In an embodiment, the engine fuel storage system 200 includes a plurality of holding tanks 202, 204, and 206. The holding tank 202 includes an elongated base 202a that extends between a top wall 202b and a bottom wall 202c located opposite the top wall 202b and defines a storage chamber 202d between the base 202a, the top wall 202b, and the bottom wall 202c. An air release valve 202e is located on the top wall 202b of the holding tank 202. The holding tank 204 includes an elongated base 204a that extends between a top wall 204b and a bottom wall 204c located opposite the top wall 204b and defines a storage chamber 204d between the base 204a, the top wall 204b, and the bottom wall 204c. An air release valve 204e is located on the top wall 204b of the holding tank 204. The holding tank 206 includes an elongated base 206a that extends between a top wall 206b and a bottom wall 206c located opposite the top wall 206b and defines a storage chamber 206d between the base 206a, the top wall 206b, and the bottom wall 206c. An air release valve 206e is located on the top wall 206b of the holding tank 206. A fuel agitation system is coupled to each of the holding tanks 202, 204, and 206 and includes an air filter 208 that is coupled to an air pump 210 through an air passageway 212 and an air passageway 214 extending from the air pump 212. The air filter 208 is a conventional air filter that is operable to remove impurities from air moved through it, and the air pump 210 is a conventional air pump that is operable to pump air filtered through the air filter 208 into the air passageway 214. The air passageway 214 enters the holding tank 202 though the base 202a adjacent the top wall 202b and extends through the storage chamber 202d until it exits the holding tank 202 through the base 202a adjacent the top wall 202b. The air passageway 214 then enters the holding tank 204 though the base 204a adjacent the top wall 204b and extends through the storage chamber 204d until it exits the holding tank 204 through the base 204a adjacent the top wall 204b. The air passageway 214 then enters the holding tank 206 though the top wall 206b and extends into the storage chamber 206d.

An air passageway 216 is coupled to the air passageway 214 by a coupling 218 and extends from a location adjacent the top wall 202b of the holding tank 202, through the storage chamber 202d, and to a location adjacent the bottom wall 202c of the holding tank 202. In an embodiment, the coupling 218 is a rotational coupling. An fuel agitation member 220 is coupled to the end of the air passageway 216 opposite the coupling 218 and, in an embodiment, includes a circular disk having a plurality of valves 220a extending from the fuel agitation member 220 and into the storage chamber 202d. An elongated fuel agitation member 222 is coupled to the air passageway 214 by a coupling 224 and extends from a location adjacent the top wall 204b of the holding tank 204, through the storage chamber 204d, and to a location adjacent the bottom wall 204c of the holding tank 204. In an embodiment, the coupling 222 is a rotational coupling. In an embodiment, the fuel agitation member 222 includes a plurality of valves 222a extending from the fuel agitation member 222 and into the storage chamber 204d. A first fuel agitation member 226 is coupled to the air passageway 214 by a coupling 228 and extends from a location adjacent the top wall 206b of the holding tank 206, through the storage chamber 206d, and to a location adjacent the bottom wall 206c of the holding tank 206. In an embodiment, the coupling 228 is a rotational coupling. The first fuel agitation member 226 includes a plurality of valves 226a extending from the first fuel agitation member 228 and into the storage chamber 206d. A second fuel agitation member 230 is coupled to the end of the first fuel agitation member 226 opposite the coupling 228 and, in an embodiment, includes a circular disk having a plurality of valves 230a extending from the fuel agitation member 230 and into the storage chamber 206d.

Figure 3:
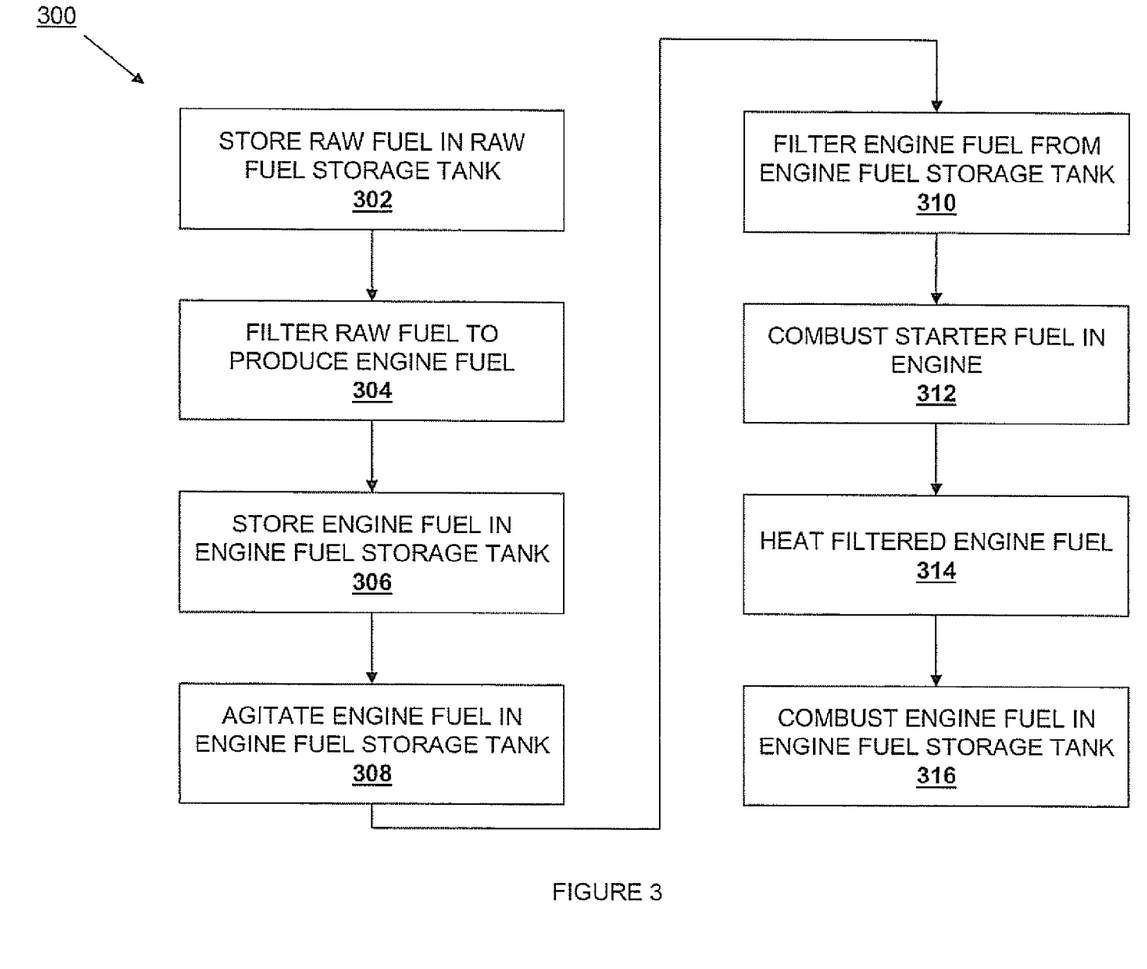
FIG. 3 is a flow chart illustrating an embodiment of a method for power generation.
Figure 4A:
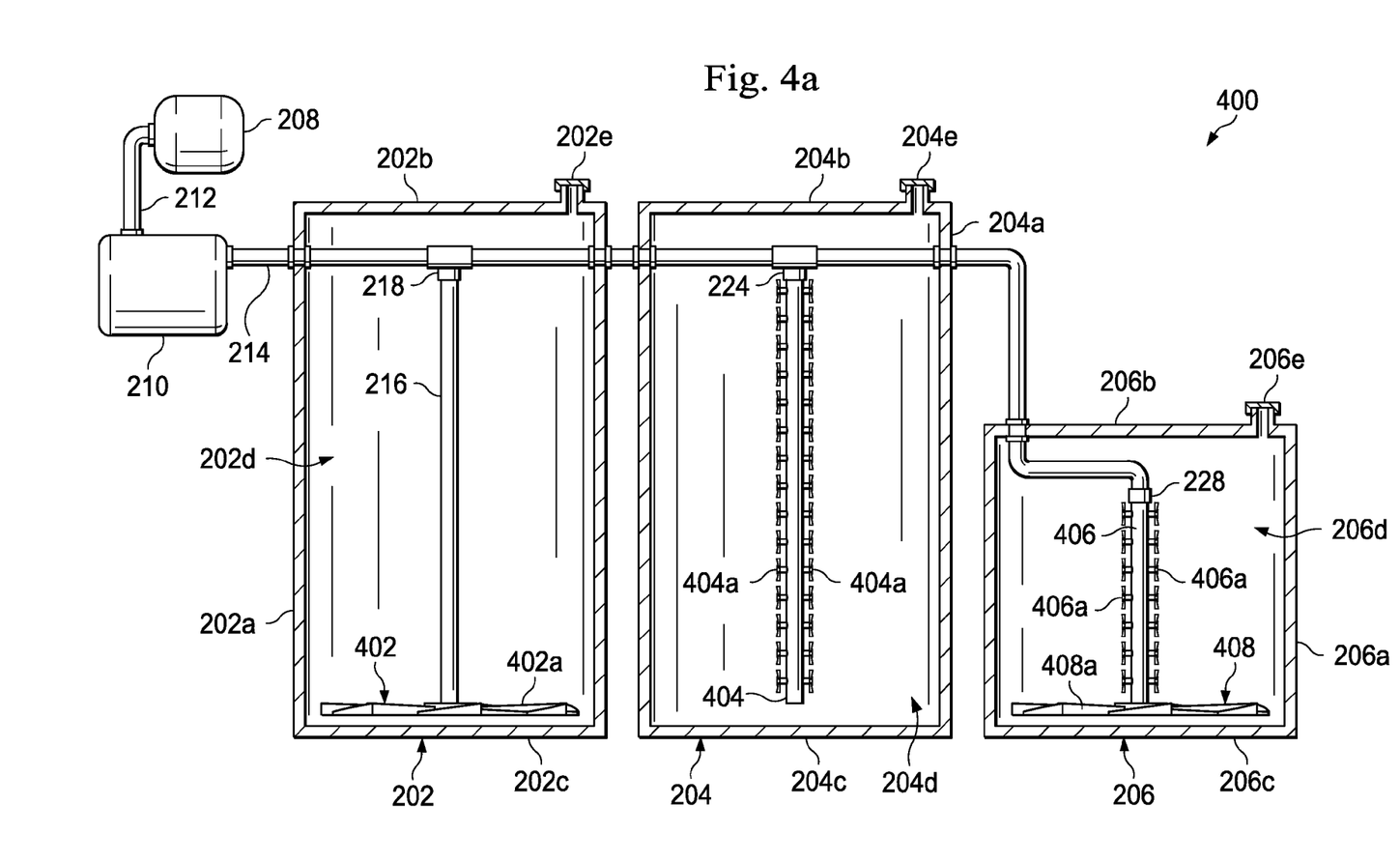
FIG. 4a is a side view illustrating an alternative embodiment of engine fuel storage system used in the power generation system of FIG. 1.
Figure 4B:
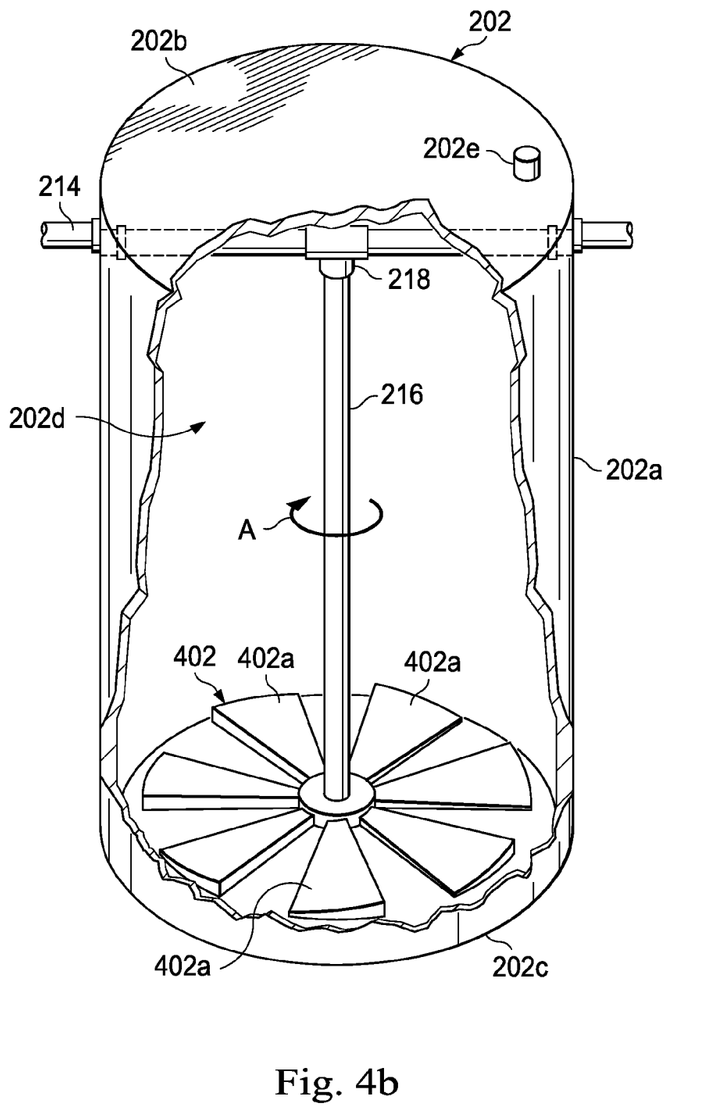
Figure 4C:
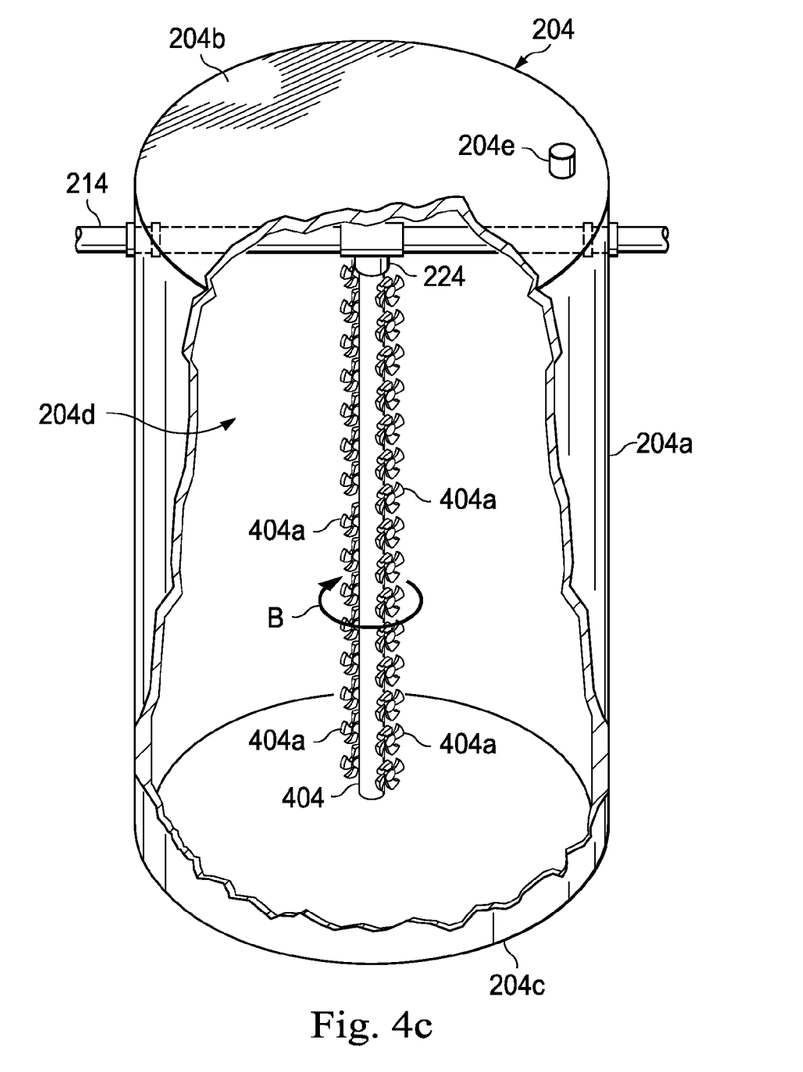
Figure 4D:
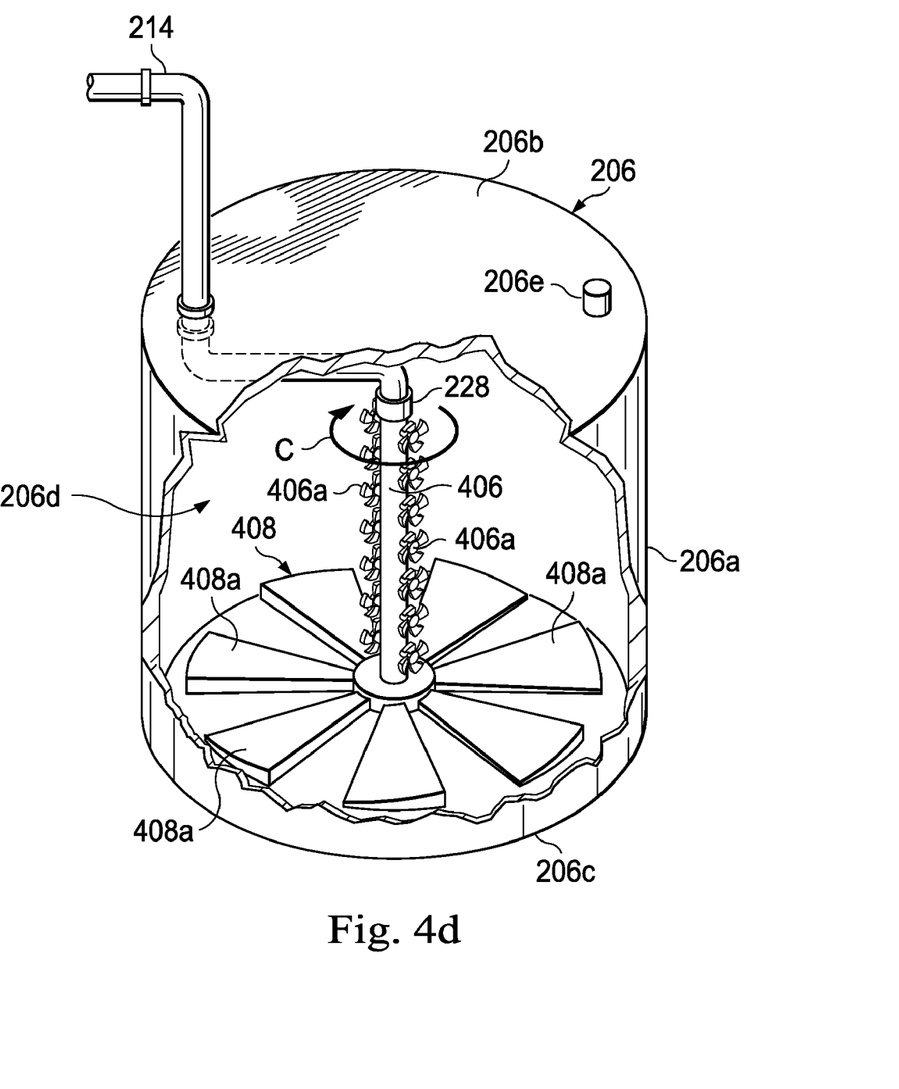

Referring now to FIGS. 1 and 3, a method 300 for generating power is illustrated. The method 300 begins at step 302 where raw fuel is stored in the raw fuel storage tank 102. Raw fuel such as, for example, waste vegetable oil, waste peanut oil, waste corn oil, waste canola oil, combinations thereof, or a variety of other raw fuels known in the art, is collected and stored in the raw fuel tank 102. The method 300 then proceeds to step 304 where the raw fuel is filtered to produce engine fuel. The raw fuel in the raw fuel tank 102 is moved through the filtration system 104 in order to filter out impurities in the raw fuel. The filtration system 104 filters out impurities in the raw fuel such that the raw fuel is converted to engine fuel that may be combusted in the engine 110 without introducing any impurities into the engine 110 that might hinder the functions of the engine 110. The method 300 then proceeds to step 306 where engine fuel is stored in the engine fuel storage system 200. The engine fuel produced by filtering the raw fuel through the filtration system 104 is transferred to and stored in the engine fuel storage system 200 for use by the engine 200.

Referring now to FIGS. 1, 2a, 2b, 2c, 2d and 3, the method 300 proceeds to step 308 where engine fuel in the engine fuel storage system 200 is agitated. The engine fuel produced by filtering the raw fuel through the filtration system 104 in step 304 of the method 300 is stored in the holding tanks 202, 204 and 206. In an embodiment, the engine fuel is a fuel that will at least partially solidify without agitation. The air pump 210 is then activated in order to draw air through the air filter 208 and into the air pump 210. The air filter 208 filters out any impurities in the air that might contaminate the engine fuel that is stored in the holding tanks 202, 204 and 206. The air pump 210 moves the air filtered through the air filter 208 into the air passageway 214. Air may then travel from the air passageway 214 down through the air passageway 216 located in the holding tank 202 and into the fuel agitation member 220 such that air is released from the plurality of valves 220a and into the engine fuel located in the storage chamber 202d. The air moves through the engine fuel located in the storage chamber 202d and agitates the engine fuel to prevent the engine fuel from stagnating, solidifying, and/or becoming unsuitable for combustion by the engine 110. In an embodiment, the coupling 218 is a rotatable coupling that is actuated by the air flow between the air passageway 214 and the air passageway 216 such that the air passageway 216 rotates in a direction A as air is released from the plurality of valves 220a. Air released from the plurality of valves 220a and into the storage chamber 202d may be released from the storage chamber 202d by the air valve 202e located on the top wall 202b of the holding tank 202.

Air may also travel from the air passageway 214 down through the fuel agitation member 222 located in the holding tank 204 such that air is released from the plurality of valves 222a and into the engine fuel located in the storage chamber 204d. The air moves through the engine fuel located in the storage chamber 204d and agitates the engine fuel to prevent the engine fuel from stagnating, solidifying, and/or becoming unsuitable for combustion by the engine 110. In an embodiment, the coupling 224 is a rotatable coupling that is actuated by the air flow between the air passageway 214 and the fuel agitation member 222 such that the fuel agitation member 222 rotates in a direction B as air is released from the plurality of valves 222a. Air released from the plurality of valves 222a and into the storage chamber 204d may be released from the storage chamber 204d by the air valve 204e located on the top wall 204b of the holding tank 204. Air may also travel from the air passageway 214 down through the first fuel agitation member 226 located in the holding tank 206 and into the second fuel agitation member 230 such that air is released from the plurality of valves 226a and 230a and into the engine fuel located in the storage chamber 206d. The air moves through the engine fuel located in the storage chamber 206d and agitates the engine fuel to prevent the engine fuel from stagnating, solidifying, and/or becoming unsuitable for combustion by the engine 110. In an embodiment, the coupling 228 is a rotatable coupling that is actuated by the air flow between the air passageway 214 and the fuel agitation member 226 such that the fuel agitation member 226 rotates in a direction C as air is released from the plurality of valves 226a and 230a. Air released from the plurality of valves 226a and 230a and into the storage chamber 206d may be released from the storage chamber 206d by the air valve 206e located on the top wall 206b of the holding tank 206.

Referring now to FIGS. 1 and 3, the method 300 proceeds to step 310 where engine fuel from the engine fuel storage system 200 is filtered. The engine fuel in the engine fuel storage system 200 is moved through the filtration system 106 in order to filter out impurities in the engine fuel. The filtration system 108 filters out impurities in the engine fuel such that the engine fuel may be combusted in the engine 110 without introducing any impurities into the engine 110 that might hinder the functions of the engine 110. The method 300 then proceeds to step 312 where starter fuel is combusted in the engine 110. In an embodiment, the engine 110 combusts starter fuel stored in the starter fuel storage tank 112 in order to start the engine 110 and power the heating system 108. The method 300 then proceeds to step 314 where the filtered engine oil is heated. The engine oil filtered through the filtration system 106 in step 310 of the method 300 is heated by the heating system 108 in order to lower the viscosity of the engine oil such that it is suitable for combustion in the engine 110. The method then proceeds to step 316 where the engine oil is combusted in the engine 110. The engine 110 combusts engine fuel from the heating system 108 and converts the thermal energy from combustion into mechanical energy in order to provide power.

Referring now to FIGS. 4a, 4b, 4c and 4d, in an alternative embodiment, an engine fuel storage system 400 is substantially similar in design and operation to the engine fuel storage system 200, described above with reference to FIGS. 1, 2a, 2b, 2c, 2d, 2e and 3, with the provision of an fuel agitation member 402 replacing the fuel agitation member 220, an fuel agitation member 404 replacing the fuel agitation member 222, and a first fuel agitation member 406 and a second fuel agitation member 408 replacing the first fuel agitation member 226 and the second fuel agitation member 230, respectively. The fuel agitation member 402 includes a plurality of fluid flow creation devices 402a. The fuel agitation member 404 includes a plurality of fluid flow creation devices 404a. The first fuel agitation member 406 and the second fuel agitation member 408 include a plurality of fluid flow creation devices 406a and 408a, respectively. In operation, the engine fuel storage system 400 operates substantially similarly to the engine fuel storage system 200 according to the method 300, with the provision of a modified step 308. During the modified step 308, air may be used to actuate the rotatable coupling 218 such that the air passageway 216 rotates in the direction A and allows the fluid flow creation member 402a to agitate the engine fuel to prevent the engine fuel from stagnating, solidifying, and/or becoming unsuitable for combustion by the engine 110. Air released into the storage chamber 202d during this process may be released from the storage chamber 202d by the air valve 202e located on the top wall 202b of the holding tank 202.

Air may also travel from the air passageway 214 down through the fuel agitation member 404 located in the holding tank 204 to actuate the fluid flow creation devices 404a such that the fluid flow creation devices 404a agitate the engine fuel to prevent the engine fuel from stagnating, solidifying, and/or becoming unsuitable for combustion by the engine 110. In an embodiment, the coupling 224 is a rotatable coupling that is actuated by the air flow between the air passageway 214 and the fuel agitation member 404 such that the fuel agitation member 404 rotates in a direction B as the fluid flow creation devices 404a agitate the engine fuel. Air released into the storage chamber 204d during this process may be released from the storage chamber 204d by the air valve 204e located on the top wall 204b of the holding tank 204. Air may also travel from the air passageway 214 down through the first fuel agitation member 406 located in the holding tank 206 to actuate the fluid flow creation devices 406a while air is also used to actuate the rotatable coupling 228 to rotate the first fuel agitation member 406 and the second fuel agitation member 408 in a direction C such that the fluid flow creation devices 408a and 406a agitate the engine fuel to prevent the engine fuel from stagnating, solidifying, and/or becoming unsuitable for combustion by the engine 110. In an embodiment, a combination of the fuel agitation members 220, 222, 226, 230, 402, 404, 406 and 408 may be used in the engine fuel storage system 200 or 400. Furthermore, while the engine fuel storage systems 200 and 400 are illustrated and described using air to power the fuel agitation system pneumatically, one of skill in the art will recognize that hydraulic power, mechanical power, or a variety of other power systems may be used to power the fuel agitation system in order to agitate fuel in the engine fuel storage system 200 or 400.

Figure 5:
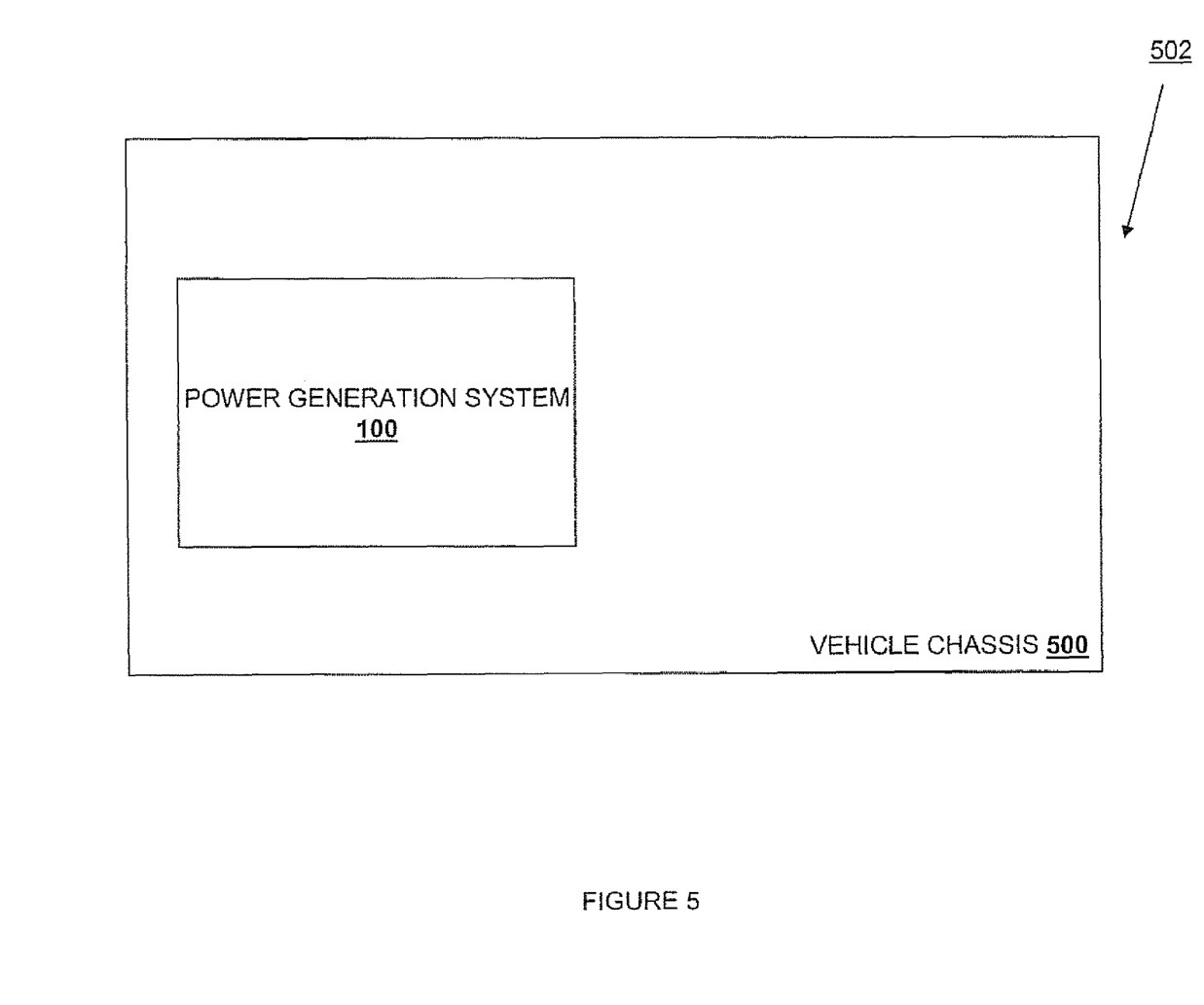
FIG. 5 is a perspective view illustrating an embodiment of a vehicle using the power generation system of FIG. 1.

Referring now to FIG. 5, in an alternative embodiment, the power generation system 100, described above with reference to FIGS. 1, 2a, 2b, 2c, 2d, 3, 4a, 4b, 4c and 4d, may be located in a vehicle chassis 500, with the engine 110, the raw fuel storage tank 102, the starter fuel storage tank 112, and the engine fuel storage system 200 mounted to the vehicle chassis 500, in order to provide power to a vehicle 502. In an embodiment, the vehicle 502 may be, for example, an automobile.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A vehicle, comprising:
a vehicle chassis comprising an engine mounted to the vehicle chassis;
an engine fuel storage tank coupled to the engine and mounted to the vehicle chassis; and
a fuel agitation system coupled to the engine fuel storage tank and operable to agitate a fuel that is stored in the engine fuel storage tank wherein the fuel agitation system is operable to supply air to rotate a shaft extending into the engine fuel storage tank.

2. The vehicle of claim 1, wherein the engine comprises a diesel combustion engine.

3. The vehicle of claim 1, further comprising:
a raw fuel storage tank mounted to the vehicle chassis; and
a filtration system coupling the raw fuel storage tank to the engine fuel storage tank.

4. The vehicle of claim 1, further comprising:
a heating system coupling the engine fuel storage tank to the engine.

5. The vehicle of claim 1, further comprising:
a starter fuel storage tank mounted to the vehicle chassis and coupled to the engine.

6. The vehicle of claim 1, wherein the fuel agitation system is operable to agitate a vegetable oil fuel that is stored in the engine fuel storage tank for use by the engine.

7. A vehicle, comprising:
a vehicle chassis comprising an engine mounted to the vehicle chassis;
an engine fuel storage tank coupled to the engine and mounted to the vehicle chassis; and
a fuel agitation system coupled to the engine fuel storage tank and operable to agitate a fuel that is stored in the engine fuel storage tank, wherein the fuel agitation system is operable to pump air with an air pump to rotate a shaft extending into the engine fuel storage tank.

8. The vehicle of claim 7, further comprising:
a fuel stored in the engine fuel storage tank.

9. The vehicle of claim 8, wherein the fuel is a vegetable oil fuel.

10. The vehicle of claim 8, wherein the fuel comprises a fuel that will at least partially solidify without agitation.

11. A method for powering a vehicle, comprising:
providing a vehicle comprising an engine comprising an engine fuel storage tank coupled to the engine;
storing fuel in the engine fuel storage tank; and
agitating the fuel with a fuel agitation system that is coupled to the fuel storage tank and operable to agitate a fuel that is stored in the fuel storage tank, wherein the fuel agitation system is operable to pump air to rotate a shaft extending into the fuel storage tank.

12. The method of claim 11, wherein the agitating comprises agitating the fuel in order to prevent the fuel from solidifying.

* * * * *